United States Patent Office

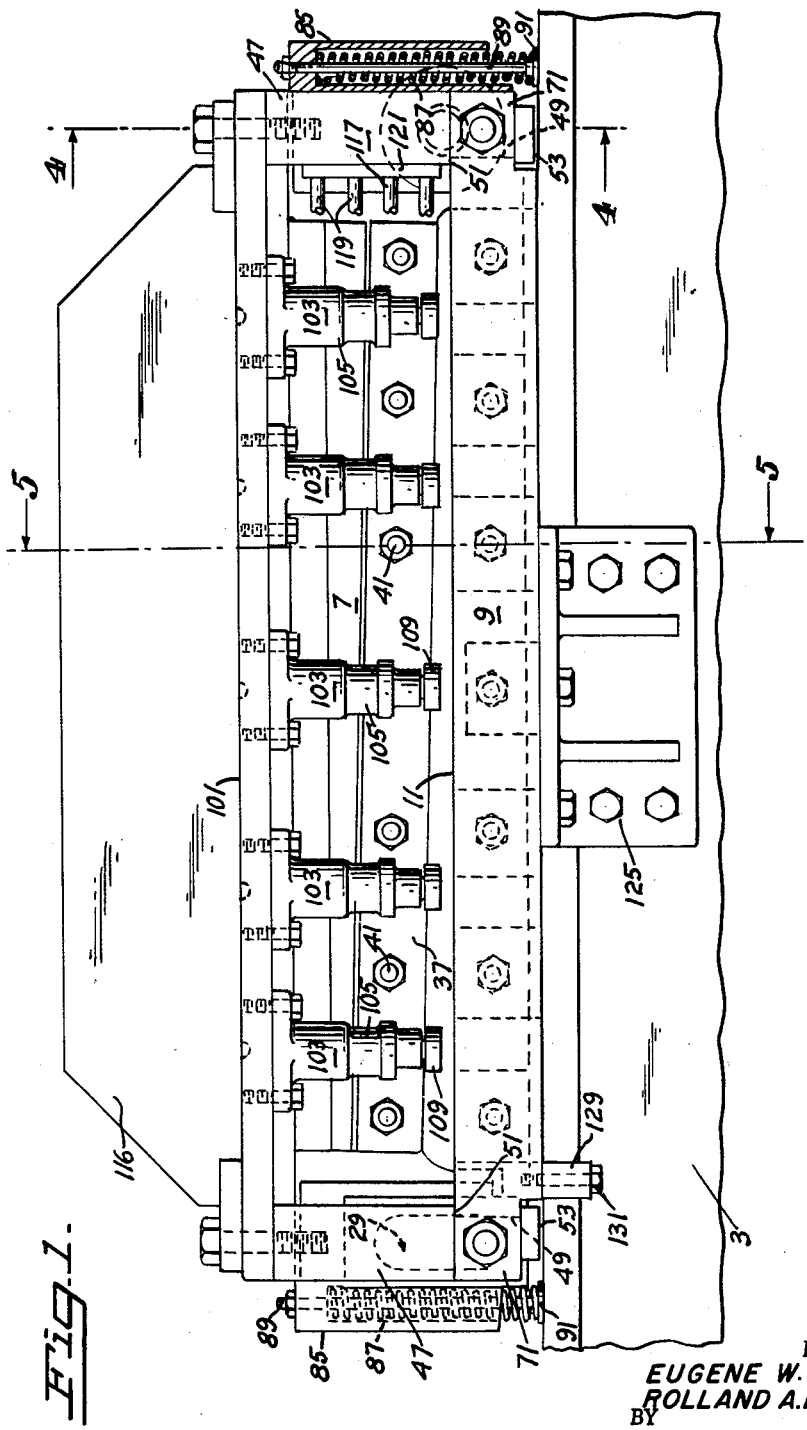

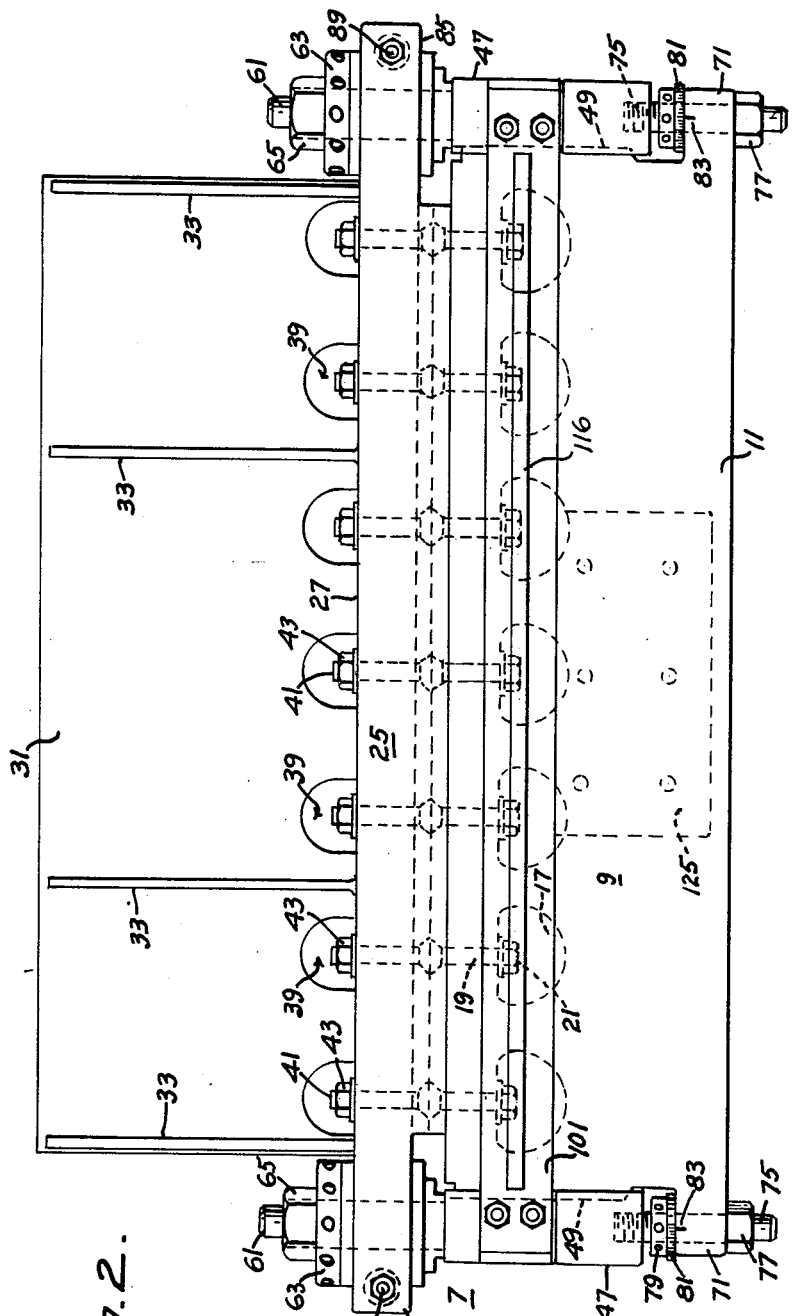

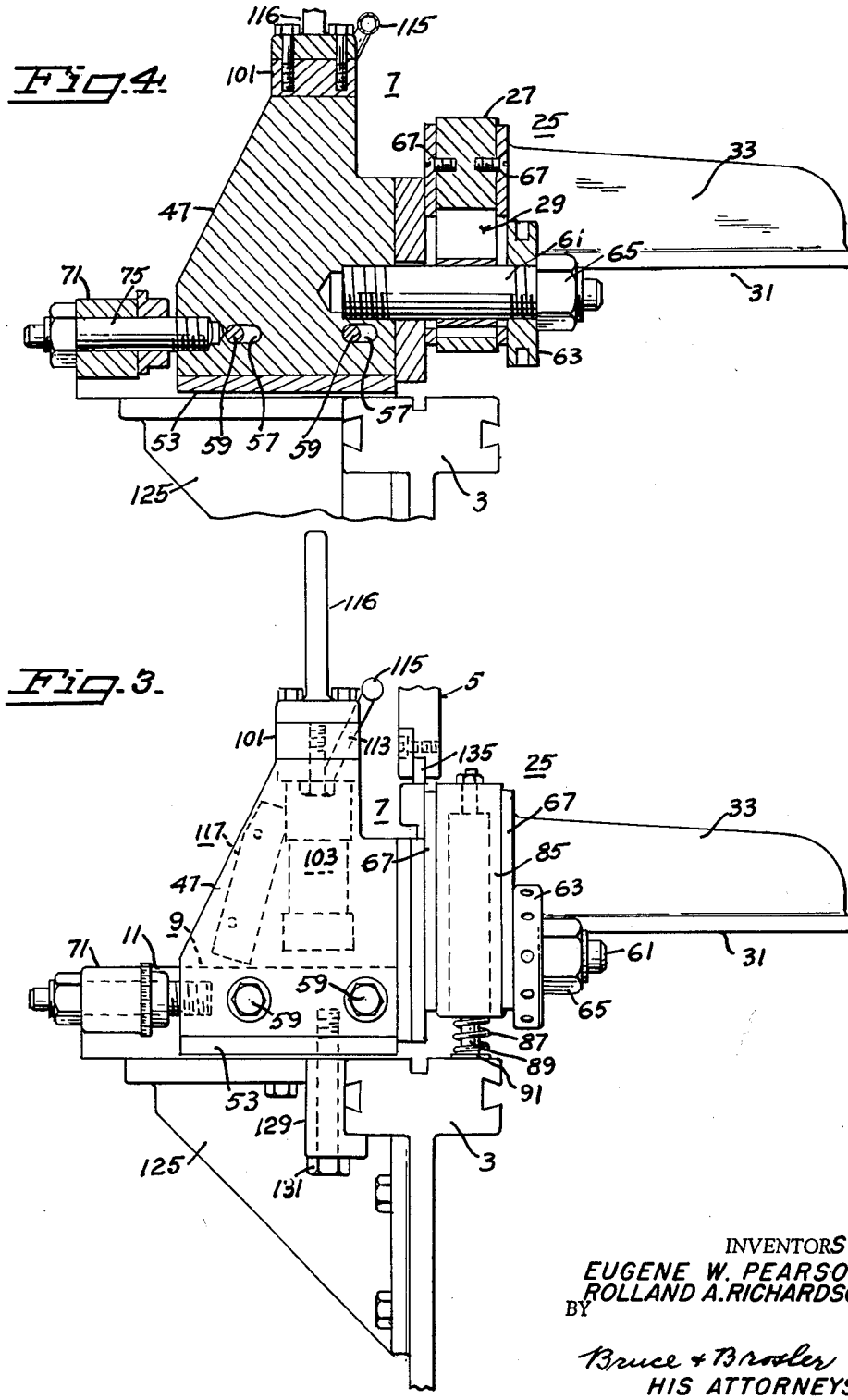

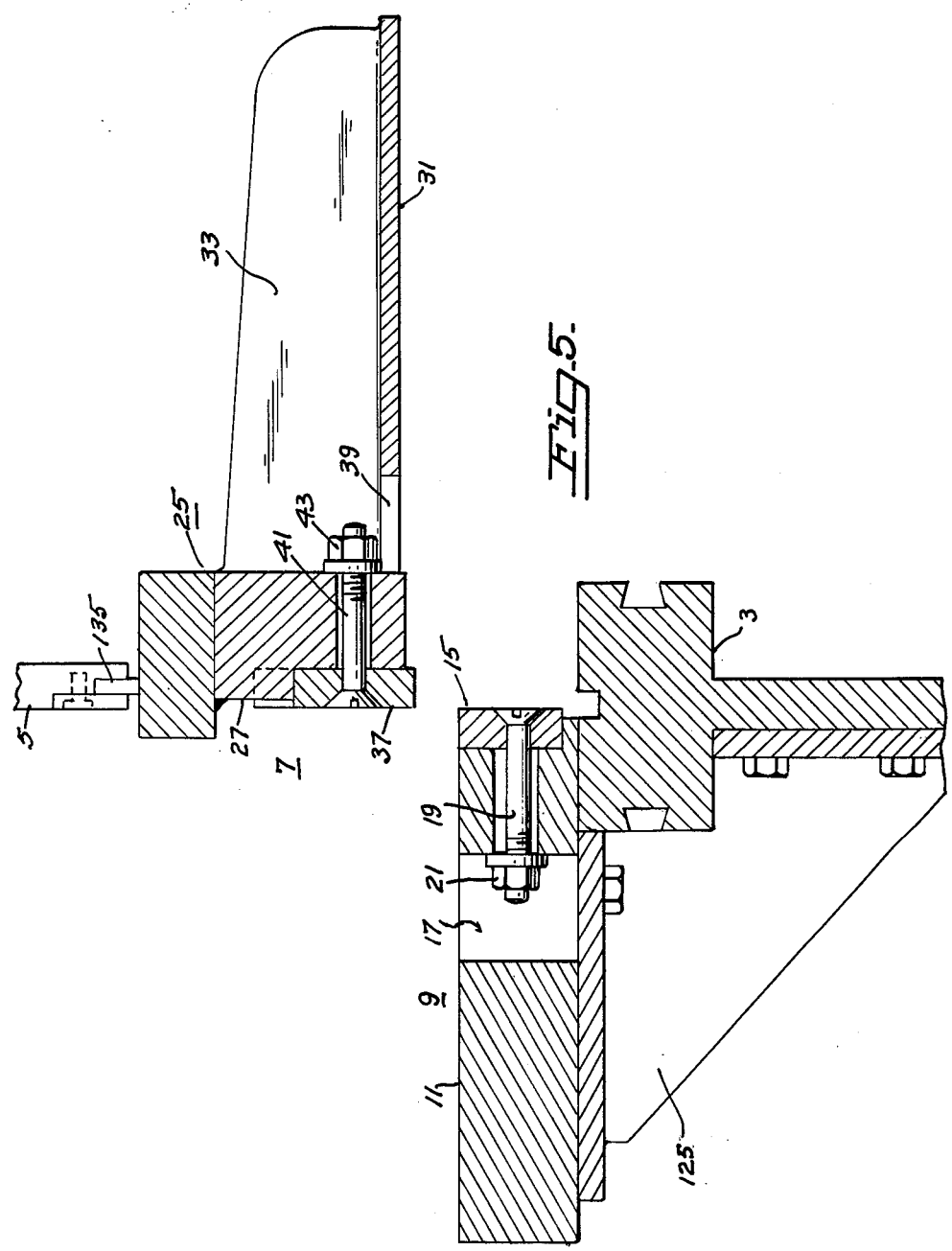

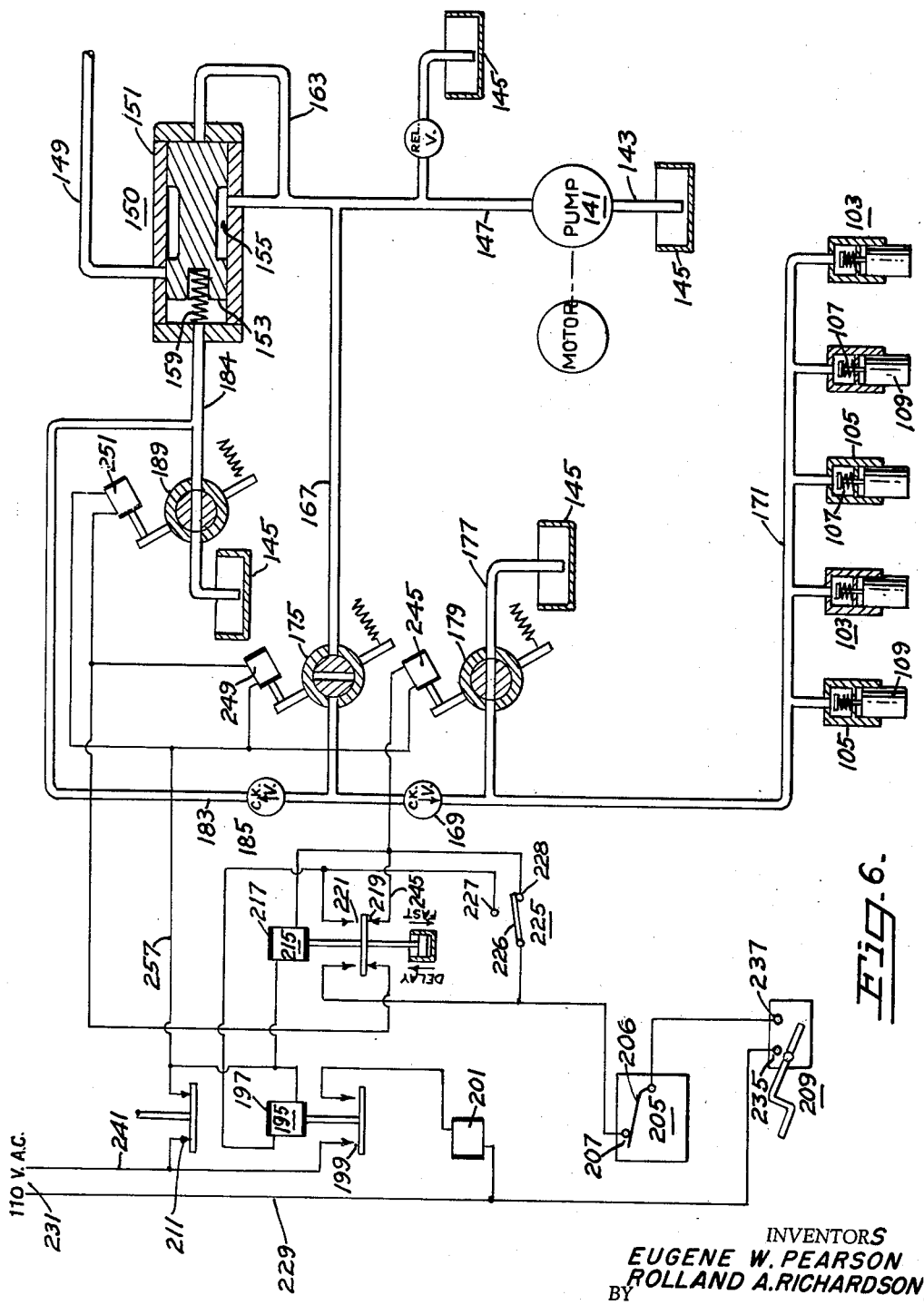

3,154,989
Patented Nov. 3, 1964

3,154,989
SHEAR ATTACHMENT FOR PRESS BRAKES
AND THE LIKE
Eugene W. Pearson, Orinda, and Rolland A. Richardson, Alameda, Calif., assignors to Pacific Industrial Manufacturing Co., a corporation of California
Filed Feb. 2, 1959, Ser. No. 790,683
5 Claims. (Cl. 83—390)

Our invention relates to shear means and more particularly to a shear attachment for use in press brakes or the like to convert such press brakes or the like into a machine capable of shearing metal plate, etc.

An attachment of this character fulfills a real need in a plant equipped with a press brake or like machine and where a need for a shear is an infrequent occasion and would not justify the investment required in a purchase of a shear machine as such.

Among the objects of our invention are:

(1) To provide a novel and improved attachment for a press brake or the like which will enable use of such machine in the shearing of metal plate, etc.;

(2) To provide a novel and improved shear attachment for a press brake or the like which is a self-contained unit assembly;

(3) To provide a novel and improved shear attachment for a press brake or the like which may be readily installed for operation in such a machine;

(4) To provide a novel and improved shear attachment for a press brake or the like, which is sufficiently rugged to shear heavy metal plate, etc.;

(5) To provide a novel and improved shear attachment for a hydraulically operated press brake or the like, such attachment having hydraulically actuated hold-down means, the proper timing of which may be realized through coupling it into the hydraulic system of the machine in which the attachment is installed;

(6) To provide a novel and improved shear attachment for a press brake or the like, having a clearance adjustment for the knives, to shear metal plate of various thicknesses with maximum efficiency.

Additional objects of our invention will be brought out in the following description of a preferred embodiment of the same, taken in conjunction with the accompanying drawings, wherein:

FIG. 1 is a front view in elevation of the shear attachment of the present invention;

FIG. 2 is a plan view of the shear attachment of FIG. 1;

FIG. 3 is an end view of the assembly of FIG. 1;

FIG. 4 is a view in section taken in the plane 4—4 of FIG. 1;

FIG. 5 is a view in section taken in the plane 5—5 of FIG. 1;

FIG. 6 is a view depicting the manner of controlling timing of the hydraulically powered hold-down means of the shear attachment of FIG. 1 from the hydraulic system of a press brake, when installed in a hydraulically powered press brake, such for example, as illustrated and described in Castle et al. Patent No. 2,558,071 of June 26, 1951.

Referring to the drawings for details of our invention in its preferred form, the same is designed for installation in a press brake or the like which comprises a machine for bending or forming metal plate and basically involves a lower or fixed die support 3 for the mounting of a powered die (not shown), and a vertically reciprocating ram 5 for the mounting of a cooperating upper die (not shown). The shear attachment 7 of the present invention is a unit assembly adapted for installation in such press brake or like machine, whereby such machine with the shear attachment installed, may be utilized in shearing metal plate or other material.

The shear attachment comprises a bed assembly 9 including a bed plate 11 having a rear edge in substantially the plane of a press brake ram 5 when the bed assembly is installed on the lower support 3 of the press brake. The rear edge of the bed plate is preferably recessed to receive a lower shear knife 15 which is bolted thereto, the bed plate having suitable openings 17 therethrough to expose the ends of holding bolts 19 and permit ready access thereto for the application of holding nuts 21.

Associated with the bed assembly, is an upper knife holder assembly 25 which includes a ram 27 having a vertical slot 29 at each end, the ram being reinforced along its length by a horizontal stiffening plate 31 extending rearwardly therefrom with stiffening ribs 33 joining the ram and stiffening plate. The lower front edge of the ram is angularly disposed in a vertical plane, and recessed to receive the upper knife 37 which is bolted thereto at a rake angle determined by the angular slope of the lower edge of the ram. Like the bed plate 11, the stiffening plate 31 of the ram is provided with openings 39 therethrough to expose the ends of the holding bolts 41 and permit access thereto for the application of the holding nuts 43.

The upper knife holder assembly 25 is mounted for reciprocal movement in substantially the plane of the press brake ram 5, such mounting, in a preferred embodiment of the invention, also permitting clearance adjustment between the upper and lower knives to accommodate the shear attachment to the shearing of metal plate of various thicknesses in the most efficient manner.

Such manner of mounting the upper knife holder assembly includes a side wall 47 at each end of the bed plate 11 which is attached thereto in a manner which permits of limited sliding movement from front to rear of said bed plate. This may be accomplished by undercutting each end of the bed plate to form a horizontal guide rib 49 at each end and providing an undercut in the proximate side wall to receive the rib thus formed and provide a shoulder 51 for such sliding movement. A slide bar 53 affixed to the lower edge of the side wall and extending beneath the rib 49 aids in the mounting and functioning of the proximate end wall.

In conjunction with such sliding attachment of the side wall to the end of the bed plate, the side wall is provided with a pair of slots 57 therethrough in the plane of the bed plate 11, each to permit passage of a holding screw 59 threadedly engaging in the edge of the bed plate. These slots and holding screws, limit the permissible sliding movement of the side wall at each end of the bed plate.

Extending rearwardly from each of the side walls, through the proximate slot in the upper knife holding ram 27 and terminating in a threaded end, is a mounting rod 61 permitting vertical guided movement of the upper knife holding ram within limits determined by the length of the slots 29 therein. A holding nut 63, preferably one of the capstan type, is applied to the exposed end of each of the mounting rods 61 to maintain the knife holding ram in a fixed plane. Backing up the holding nut 63 is a lock nut 65.

To facilitate such vertical movement of the knife holding ram, this ram is preferably provided at each end with a thrust plate 67 of bronze or other bearing metal affixed to each side thereof, such thrust plates, each having a slot in alignment with the mounting slot 29 of the ram. With the upper knife holder assembly thus mounted, any slidable adjustment of the side walls on the bed plate, will result in a change in clearance between the upper and lower knives To control such adjustments of the side walls and thereby enable an operator to stabilize clearance adjustments between the two knives, the bed plate is formed with an ear 71 at each forward corner of the plate, with such ear extending across the front edge of the proximate side wall 47 in spaced relationship thereto. Each such ear is provided with an adjusting screw passage therethrough to receive an adjusting screw 75 which freely passes therethrough and threadedly engages the proximate side wall, the adjusting screw being contained against longitudinal shaft in the ear by a nut 77 on the free end of the adjusting screw adjacent the front side of the ear, and a capstan nut 79 adjacent the rear side of the ear. About the capstan nut is a calibrated gage band 81 which may be read in conjunction with reference mark or notch 83 on that portion of the ear adjacent thereto.

By rotating both adjusting screws 75, the side walls and consequently the clearance between knives may be suitably adjusted, the gage bands indicating the extent of such adjustments, thus enabling an operator to secure corresponding adjustments at both ends.

The upper knife holding ram is resiliently supported in a normal upper rest position by providing at each end of the knife holder ram, a vertical spring housing 85 open at its lower end to receive a compression spring 87 of a length to extend beyond the open end of the housing and of sufficient calibration to support the weight of the ram and knife attached thereto.

Each spring is retained in its housing by a spring retainer in the form of an axially disposed rod 89 bolted at its upper end to the ram and carrying at its lower end a spring supporting foot 91. Accordingly, following the application of pressure sufficient to depress the knife holder ram and produce a shearing stroke, the springs 87 will serve to restore the upper knife holding ram to its upper rest position, ready for another shearing stroke.

Work to be sheared, has a tendency to be drawn into the machine by the shearing action of the upper knife as it moves past the lower knife, and consequently shear machines are normally provided with hold-down means for stabilizing the work during such shearing operation.

Such hold-down means in the present instance, includes a hold-down beam 101 spanning the side walls and affixed thereto. From this hold-down beam are suspended a plurality of hold-down cylinder assemblies 103 each of which includes a cylinder 105 affixed to the beam, and including therein a compression spring 107 supported at an intermediate point in its cylinder, and from which a piston 109 is suspended. The piston is thus adapted to be driven downwardly against the restoring action of said spring, by the application of hydraulical pressure to such piston.

The application of such hydraulic pressure is made possible through a flow connection 113 to each cylinder, formed in the hold-down beam 101, which permits for the connection of each cylinder assembly to a manifold 115 connectible to a source of fluid pressure.

Rigidity of the hold-down means is assured by a vertically disposed stiffener plate 116 running along the hold-down beam and bolted thereto.

A front guard 117 extending between the side walls to the front of the hold-down means, provides sufficient clearance with respect to the plate to permit of the feeding of work to the shearing knives while precluding the possibilities of bringing ones hands dangerously close to such knives, in the use of the shearing attachment.

Such front guard may take the form of a plurality of rods 119 supported in end plates 121 which in turn are provided with machine screws holes for affixing the same to side walls.

To facilitate the installation of the shear attachment to press brakes or the like, the bed plate 11 is provided with a depending positioning bracket 125 which is so located as to abut the lower die holder of the press brake when the knives are disposed between such lower die holder and the press brake ram.

With the shear attachment thus positioned, it is stabilized in such position by machine screws through the bracket into the lower die holder, assisted by a pair of L-clamps 129 engaging the lower die holder 3 of the press brake, below each end of the bed plate 11, with each such L-clamp having a vertical bolt passage therethrough to receive a holding screw 131 which threads into the lower side of the bed plate.

With the shear attachment thus installed, a lowering of the press brake ram 5 will cause it to act against the upper knife holder and force the upper knife 37 downwardly in a shearing action with respect to the lower fixed knife 15. The pressures thus exerted by the press brake ram will be transmitted through to the lower die holder of the press brake and its supporting structure which is designed to withstand such heavy compressive forces.

A pressure bar 135 may be clamped along the lower edge of the press brake ram for transmitting the pressure to the upper knife holder.

Upon withdrawal of the press brake ram from its pressure engagement with the upper knife holder, the end springs 87 will then be free to return the upper knife holder and associated knife to its upper rest position.

While the shear attachment illustrated and described, may be designed for use in any type of press brake or similar apparatus, it is ideally suited for use with a hydraulically operated press brake such as illustrated and described in the aforementioned patent to Castle et al. 2,558,071 of June 26, 1951, where because of the presence of hydraulic systems for actuating the press brake ram, the hydraulic hold-down means of the present shear attachment can be so tied in with the hydraulic systems of the press brake, as to bring about proper sequential functioning of the hold-down means with respect to power actuation of the press brake ram and resulting operation of the shear knives.

One manner of accomplishing this is depicted in the combined electrical-hydraulic system of FIGURE 6, wherein only those elements of the system of the aforementioned patented hydraulically operated press brake are disclosed, which are necessary to illustrate the manner of connecting the hydraulic circuit of the hold-down means to the hydraulic circuits of the press brake.

Referring to this figure of the drawing, a motor driven pump 141 having its intake or suction line 143 connected to a supply tank 145 of hydraulic fluid, represents one of the pumps of the aforementioned patent, which supplies hydraulic fluid to one of the two hydraulic systems required in the operation of the press brake involved. This pump accordingly, has a discharge line to the associated hydraulic cylinder of the press brake, such line being of two sections 147, 149 connectible through a normally closed blocking valve 150.

Such blocking valve involves a housing 151 having a spool 153 slidable therein, the reduced or mid portion of the spool forming with the housing, a chamber 155 adapted to couple the sections of the discharge line, when the spool is shifted from its normal blocking position. Such spool is urged toward this blocking position by a biasing spring 159 between a recess end of the spool and the proximate end of the housing, while a reverse movement of the spool is provided for by a by-pass connection 163 connecting the pump discharge into the opposite end of the blocking valve housing to exert pressure against the other end of the spool in opposition to the biasing spring.

A pipe connection 184 leading from the bias spring end of the blocking valve housing, is, as will be subsequently described, utilized in the present system to control operations of the blocking valve in conjunction with a timing circuit to effect proper sequential operation between the hold-down means of the shear attachment and the ram of the press brake, which in turn determines shearing operations of the shear attachment.

In this connection, the normal pump operating pressure applied against the right hand end of the spool via the by-pass connection 163, is more than sufficient to overcome the biasing force of the bias spring 159, and accordingly, in the absence of any hydraulic pressure supplementing that of the spring, the spool will be normally urged to the left end of the housing as viewed in FIGURE 6, to unblock the discharge line of the pump to the press brake.

Operation of the hold-down cylinder assemblies is accomplished through a branch line 167 extending from the pump discharge through a check valve 169 to a manifold 171 from which the various hold-down cylinders 105 are supplied with hydraulic fluid under pressure. In such branch line leading from the pump discharge, is a solenoid operated hold-down advance valve 175 which is normally spring biased to closed or blocking position.

From this supply line to the hold-down means and at a point between the check valve and the manifold, is connected a pressure release line 177 to the supply tank, in which line is connected to a solenoid operated hold-down return valve 179 which is normally biased to open position.

Thus to effect downward movement of the hold-down pistons, the hold-down advance valve 175 must be energized to open such valve and permit application of hydraulic pressure from the pump 141 to the various hold-down cylinder assemblies 103, while at the same time, the hold-down return valve 179 must be energized to close the same and block the pressure release line 177 to preclude loss of pressure.

During actuation of the hold-down pistons, the blocking valve 150 should be in blocking position to preclude any likelihood of the press brake ram going into operation to effect shearing of the work before the work is properly clamped to the bed plate. This is accomplished in the present invention by a branch connection 183 from the hydraulic line 167, from a point between the hold-down advance valve 175 and the aforementioned check valve 169, to the pipe connection or power take-off line 184 from the bias spring end of the blocking valve housing.

Thus if the power take-off line 184 were blocked, then opening of the hold-down advance valve 175 will not only connect pump pressure to the hold-down means, but will, at the same time, apply pump pressure to the bias spring end of the blocking valve housing to supplement the pressure of the bias spring 159 whereby, the accumulated pressure will be sufficient to drive the spool 153 to its blocking position. A check valve 185 is included in this branch line 183 to preclude reverse flow of liquid therein.

A solenoid operated power take-off valve 189 in the power take-off line 184 beyond the connection of the branch line 183 thereto, is normally biased to open position and must be energized to closed condition to thus block this line and enable application of pump pressure to the bias spring end of the blocking valve housing while energization of the hold-down means occurs.

The proper timing of the operation of the various solenoid operated valves to the operation of the press brake ram is accomplished through electrical control circuits involving components of the electrical control circuits of the press brake. Such components involve a "down" relay 195 having a winding 197 and a pair of normally open contacts 199, the operation of which relay energizes a solenoid 201 which controls operation of a valve (not shown) to effect downward movement of the ram of the press brake.

Also among the components involved in the electrical control circuits of the press brake is a depth limit switch 205 having an armature 206 normally engaging a contact 207, said switch being adapted to be opened by downward movement of the ram of the press brake when it approaches the lower limit of its work stroke; a foot switch 209 which functions as a master switch to initiate an operation of the press brake; and normally closed contacts 211 of an "up" relay (not shown). Associated with such components of the press brake electrical control circuits, is a time delay relay 215 involving a winding 217, a pair of normally bridged contacts 219 and a pair of normally open contacts 221. In addition to such time delay relay, there is employed a shear attachment switch 225 involving a blade 226 and alternate contacts 227 and 228.

One side 229 of a power supply source 231 is connected to one contact 235 of a pair of contacts adapted to be bridged by operation of the foot switch, the other 237 of said contacts being connected to the armature 206 of the normally closed depth limit switch 205. The remaining contact of the depth limit switch is connected directly to one of the normally open contacts 221 of the time delay relay 215, and by different connections via the shear attachment switch blade 226 and contact 228, through the time delay relay winding 217, back to the other side 241 of the power supply source by way of the normally closed contacts 211 of the "up" relay. In parallel with the winding 217 of the time delay relay, is a solenoid 245 associated with the hold-down return valve 179.

The normally closed contacts 219 of the time delay relay complete another circuit in parallel with the winding 217, such circuit including a connection to solenoids 249, 251 associated with both the hold-down advance valve 175 and power take-off valve 189, such solenoids being connected in parallel with the return line 257 going to the normally closed contacts 211 of the "up" relay of the press brake.

Thus upon closing of the foot switch 209, the power take-off valve 189 is closed, the hold-down advance valve 175 is opened, and the hold-down return valve 179 is closed, while simultaneously therewith, the time delay relay 215 is energized. Thus all the valves are conditioned to effect movement of the hold-down means to engage the work, though the period allowed for this is determined by the timing of the time delay relay 215, inasmuch as the solenoids associated with the power take-off valve and the hold-down advance valve are energized through the normally closed contacts 219 of this relay. When such time period, however, has passed, and the normally closed contacts 219 have opened, the circuits to these valves will be broken and both the power take-off valve 189 and the hold-down advance valve 175 will be restored to their normal conditions.

The hold-down return valve 179 however, remains energized to its closed condition, and this coupled with the presence of the check valve 169 in the line from the hold-down advance valve 175, blocks return of the hold-down means.

The closing of the normally open contacts 221 of the time delay relay following the opening of contacts 219, will complete a circuit through the winding 197 of the "down" relay of the press brake, to close the normally open contacts 199 associated therewith. This completes a circuit through the solenoid 201 associated with the valve of the press brake that determines downward movement of the ram of the press brake. Thus proper sequence is realized in the operation of the hold-down means in relationship to the work stroke of the press brake ram, which in turn acts against the shear attachment to produce a shearing stroke.

When the press brake is to be used as such, that is without the shearing attachment installed, the blade 226 of the switch 225 will be placed in engagement with contact 227. This disconnects all relays and valves added to the press brake systems and circuits to tie in the operation of the hold-down means to that of the press brake ram, and thus restores the press brake systems and circuits to normalcy for conventional press brake operation.

From the foregoing, it will be apparent that our invention fulfills all the objects attributed thereto and while we have illustrated and described the same in its preferred form and in considerable detail, the same is subject to alteration and modification without departing from the underlying principles involved and we accordingly do not desire to be limited to the specific details illustrated and described except as may be necessitated by the appended claims.

We claim:

1. A shear attachment for press brakes or the like having a lower support of substantial length and a ram of comparable length reciprocally movable with respect to said lower support, said shearing attachment comprising a bed assembly adapted to rest on said lower support, said bed assembly including a bed plate of substantial length and having a rear edge in substantially the plane of said press brake ram when said bed assembly is installed on said lower support, and means for supporting a shear knife along said rear edge; an upper knife holder assembly, including a ram of the flat plate type and an upper knife affixed thereto, means for reciprocally mounting said upper knife holder assembly to said bed assembly to permit of reciprocating movement of said upper knife ram in substantially the plane of said press brake ram, said mounting means including a side wall at each end of said bed plate; hold-down means for holding work to said bed plate for shearing, said hold-down means including a hold-down beam spanning the distance between said side walls and affixed thereto, a plurality of hold-down cylinder assemblies suspended from said hold-down beam, each of said cylinder assemblies including a cylinder affixed to said beam, said hold-down beam having a flow passage to each of said cylinders for connection of said cylinders to a source of fluid pressure; and means for stabilizing said shearing attachment on the lower support of a press brake.

2. A shear attachment for press brakes or the like having a lower support of substantial length and a ram of comparable length reciprocally movable with respect to said lower support, said shearing attachment comprising a bed assembly adapted to rest on said lower support, said bed assembly including a bed plate of substantial length and having a rear edge in substantially the plane of said press brake ram when said bed assembly is installed on said lower support, and means for supporting a shear knife along said rear edge; an upper knife holder assembly including a ram of the flat plate type having a vertical slot at each end and means for supporting a knife on said ram for cooperation with said lower knife to effect shearing; means for mounting said upper knife holder assembly to said bed assembly to permit of reciprocating movement of said upper knife ram in substantially the plane of said press brake ram, said mounting means including a side wall at each end of said bed plate, means slidably affixing said upper knife holder assembly to said side walls, said last means including a rod extending rearwardly from each side wall through the proximate one of said slots in said upper knife ram and terminating in a threaded end, and holding nuts threadedly secured to said rods; means, in the absence of pressure from said press brake ram, for supporting said knife holder ram in a normal upper rest position; and means for stabilizing said shearing attachment on the lower support of a press brake when installed in such press brake.

3. A shear attachment for press brakes or the like having a lower support of substantial length and a ram of comparable length reciprocally movable with respect to said lower support, said shearing attachment comprising a bed assembly adapted to rest on said lower support, said bed assembly including a bed plate of substantial length and having a rear edge in substantially the plane of said press brake ram when said bed assembly is installed on said lower support, and means for supporting a shear knife along said rear edge; an upper knife holder assembly including a ram of the flat plate type having a vertical slot at each end, and means for supporting a knife on said ram for co-operation with said lower knife to effect shearing; means for mounting said upper knife holder assembly to said bed assembly to permit of reciprocating movement of said upper knife ram in substantially the plane of said press brake ram, said mounting means including a side wall at each end of said bed plate, means slidably affixing said upper knife holder assembly to said side walls, said last means including a rod extending rearwardly from each side wall through the proximate one of said slots in said upper knife ram and terminating in a threaded end, and holding nuts threadedly secured to said rods; means, in the absence of pressure from said press brake ram, for supporting said knife holder ram in a normal upper rest position; and means for stabilizing said shear attachment on the lower support of a press brake, said means including a stop wall depending from said bed plate adjacent the front edge thereof to locate said attachment with its upper knife holder ram beneath the ram of a press brake when installed in such press brake.

4. A shear attachment for press brakes or the like having a lower support of substantial length and a ram of comparable length reciprocally movable with respect to said lower support, said shearing attachment comprising a bed assembly adapted to rest on said lower support, said bed assembly including a bed plate of substantial length and having a rear edge in substantially the plane of said press brake ram when said bed assembly is installed on said lower support, and means for supporting a shear knife along said rear edge; an upper knife holder assembly including a ram of the flat plate type having a vertical slot at each end, and means for supporting a knife on said ram for co-operation with said lower knife to effect shearing; means for mounting said upper knife holder assembly to said bed assembly to permit of reciprocating movement of said upper knife ram in substantially the plane of said press brake ram, while permitting clearance adjustment between said upper and lower knives, said mounting means including a side wall at each end of said bed plate, means slidably affixing each of said side walls to its end of said bed plate for limited sliding movement thereon, a rod extending rearwardly from each side wall through the proximate one of said slots in said upper knife ram and holding means secured to said rods, an ear at each forward corner of said plate and extending across the front edge of the proximate side wall in spaced relationship thereto, each ear having an opening therethrough, an adjusting screw rotatably fixed in each of said ears and threadedly engaging the proximate side wall whereby rotation of such adjusting screws will enable clearance adjustments of said upper knife with respect to said lower knife; means, in the absence of pressure from said press brake ram, for supporting said knife holder ram in a normal upper rest position, hold-down means for holding work to said bed plate for shearing, said hold-down means including a hold-down beam spanning said side walls and affixed thereto, a plurality of hold-down cylinder assemblies suspended from said hold-down beam, each of said cylinder assemblies including a cylinder affixed to said beam, a compression spring supported at an intermediate point in said cylinder, and a piston suspended from said spring in said cylinder, and said hold-down beam having a flow passage to each of said cylinders for connection of said cylinders to a source of fluid pressure; and means for stabilizing said shearing attachment on the lower support of a press brake when installed in such press brake.

5. A shear attachment for press brakes or the like having a lower support of substantial length and a ram of comparable length reciprocally movable with respect to said lower support, said shearing attachment comprising a bed assembly adapted to rest on said lower support, said bed assembly including a bed plate of substantial length having a rear edge in substantially the plane of said press brake ram when said bed assembly is installed on said lower support, said rear edge being recessed to receive a lower shear knife, and means for supporting a shear knife in said recess; an upper knife holder assembly including a ram of the flat plate type having a vertical slot at each end and reinforced along its length by a horizontal stiffening plate extending rearwardly therefrom with stiffening ribs joining said ram and stiffening plate, and means for supporting a knife on said ram; means for mounting said upper knife holder assembly to said bed assembly to permit of reciprocating movement of said upper knife ram in substantially the plane of said press brake ram, while permitting clearance adjustment between said upper and lower knives; means, in the absence of pressure from said press brake ram, for resiliently supporting said knife holder ram in a normal upper rest position, said means including a vertical spring housing at each end of said knife holder ram, a spring in each of said spring housings and exposed through the lower end thereof, and means for retaining each of said springs in its housing and means for stabilizing said shearing attachment on the lower support of a press brake, said means including a stop wall depending from said bed plate adjacent the front edge thereof to locate said attachment with its upper knife holder ram beneath the ram of a press brake when installed in such press brake, and means for clamping said shearing attachment in such installed position.

References Cited in the file of this patent
UNITED STATES PATENTS

| | | |
|---|---|---|
| 496,167 | McGray | Apr. 25, 1893 |
| 1,843,362 | Hazelton | Feb. 2, 1932 |
| 2,317,424 | Wales | Apr. 27, 1943 |
| 2,319,568 | Wales | May 18, 1943 |
| 2,359,566 | Leslie | Oct. 3, 1944 |
| 2,400,996 | Iversen | May 28, 1946 |
| 2,506,651 | Seybold | May 9, 1950 |
| 2,558,071 | Castle | June 26, 1951 |
| 2,734,572 | Pater | Feb. 14, 1956 |
| 2,781,844 | Pearson | Feb. 19, 1957 |